United States Patent [19]

Vanderpool et al.

[11] Patent Number: 5,717,019
[45] Date of Patent: Feb. 10, 1998

[54] PVC BUILDING TRIM

[75] Inventors: Peter J. Vanderpool, Plano, Tex.; Carl E. Anderson, 1011 Capouse Ave., Scranton, Pa. 18509

[73] Assignee: Carl E. Anderson, Scranton, Pa.

[21] Appl. No.: 679,743

[22] Filed: Jul. 15, 1996

Related U.S. Application Data

[63] Continuation of Ser. No. 393,869, Feb. 24, 1995, abandoned.

[51] Int. Cl.$^6$ ............... C08K 3/26; C08K 3/22; C08L 27/26
[52] U.S. Cl. ........... 524/425; 524/567; 524/413; 52/309.13
[58] Field of Search ............... 524/425, 427, 524/497, 567, 413; 52/309.13

[56] References Cited

U.S. PATENT DOCUMENTS

| | | | |
|---|---|---|---|
| 3,996,173 | 12/1976 | Heichele et al. | 524/425 |
| 4,239,679 | 12/1980 | Rolls et al. | 524/425 |
| 4,294,752 | 10/1981 | Silverberg | 524/425 |
| 4,310,451 | 1/1982 | Ernest et al. | 524/425 |
| 4,474,913 | 10/1984 | Lindner | 524/567 |
| 5,124,373 | 6/1992 | Baumgaertel et al. | 524/425 |

FOREIGN PATENT DOCUMENTS

| | | | |
|---|---|---|---|
| 0516197 | 12/1992 | European Pat. Off. | 524/497 |
| 2815176 | 11/1978 | Germany | 524/425 |
| 0033262 | 10/1973 | Japan | 524/425 |
| 0084346 | 6/1980 | Japan | 524/567 |
| 1564087 | 4/1980 | United Kingdom . | |

*Primary Examiner*—Peter A. Szekely
*Attorney, Agent, or Firm*—Helfgott & Karas, P.C.

[57] ABSTRACT

The material is an extruded high impact, exterior PVC material comprising no more that 80 percent by weight of PVC resin and about 7 percent by weight of filler, said material being permanently bendable and has an average coefficient of thermal expansion of about 2.7×10 in/in/degree Fahrenheit over the range of ambient temperatures from minus 4 to plus 86 degrees Fahrenheit.

A unique method of making the material extrudes it at lower temperatures than usually utilized. The material, formed in a strip is cooled to limited temperatures immediately before it is coiled.

7 Claims, 3 Drawing Sheets

Comparison of High Impact, Exterior Grade, PVC Composition

| | Prior Art vs. Invention | | | | | |
|---|---|---|---|---|---|---|
| | By Parts/100 PVC Resin | | | By Weight % | | |
| | PRIOR ART (PVC SIDING) | | INVENTION | PRIOR ART | | INVENTION |
| | RANGE | AVERAGE | | AVERAGE | | |
| PVC RESIN | 100 | 100 | 100 | 81.33 | | 79.03 |
| TITANIUM DIOXIDE | 8-10 | 9 | 9 | 7.32 | | 7.11 |
| IMPACT MODIFIER | 4.5-6 | 5.25 | 4 | 4.26 | | 3.16 |
| FILLER | 3-5 | 4 | 9 | 3.25 | | 7.11 |
| ALL OTHER* | 3.4-6 | 4.7 | 4.52 | 3.82 | | 3.57 |

*HEAT STABILIZER, PROCESS AID, CALCIUM STEARATE, LUBRICANTS

FIG. 1

COEFFICIENT OF LINEAR THERMAL EXPANSION OF INVENTION
ASTM-TEST D-696

| TEMPERATURE (FAHRENHEIT) | CLTE X10 IN/IN/DEGREE F. | |
|---|---|---|
| -4° | 2.58 | |
| 14° | 2.64 | AVERAGE: CLTE=2.7X10IN/IN/DEGREE F. |
| 32° | 2.70 | |
| 50° | 2.70 | (-22° = 0 ) |
| 68° | 2.75 | |
| 86° | 2.81 | |

FIG. 3

| | ASTM | EXISTING BENDABLE PVC MATERAL | INVENTION |
|---|---|---|---|
| TENSILE YIELD STRENGTH, PSI | D-638 | 6,900 | 6,200 |
| TENSILE MODULUS, PSI | D-638 | 360,000 | 365,000 |
| FLEXURAL YIELD STRENGTH, PSI | D-790 | 13,000 | 12,000 |
| FLEXURAL MODULUS, PSI | D-790 | 430,000 | 410,000 |

FIG. 4

PVC BUILDING TRIM

This is continuation of application Ser. No. 08/393,869, filed Feb. 24, 1995 now abandoned.

This invention relates to permanently bendable, high impact, exterior polyvinyl chloride material, commonly referred to as PVC material, useful as building trim and for other uses and methods for making such PVC material.

BACKGROUND OF THE INVENTION

In the patent application Ser. No. 07/805,853 now U.S. Pat. No. 5,551,201 filed on Dec. 10, 1991, there is disclosed the discovery that certain existing high impact, exterior PVC material previously used only in articles of manufacture permanently bent during extrusion into predetermined shapes, such as for use as siding or molding, may be bent insitu without cracking, and thus may function also for use as building trim. As explained in such copending Patent Application, the disclosed PVC materials may be bent insitu with the aid of a portable bending brake to form a crease which will be retained and form a permanent sharp edge in the material. The disclosed PVC materials are also sufficiently flexible that strips of the material may be formed into coils for easy transportability and will conform to rounded surfaces without cracking or creasing. The PVC materials are also trimmable with a razor blade or shears making it easy to mate adjacent surfaces. They, of course, have all the other desirable properties—durability, impact strength, color retention, etc. of such exterior grade PVC materials. Three such permanently bendable PVC materials are disclosed as being "Oxyblend 3773 PVC Compound" and "Oxyblend 3315 White" made by Occidental Chemical Corporation, Wayne, Pa., and "BWSBHXX" made by Nan Ya Plastics Corporation, Carteret, N.J.

The PVC melt compositions from which such high impact, exterior PVC materials are extruded include PVC resin, titanium dioxide, impact modifier, and filler as the principal property-determining ingredients, usually comprising about 96% by weight of the composition. The remaining ingredients may include minor percentages of a heat stabilizer, process aid, calcium stearate, and lubricants. The PVC resin comprises at least 80% by weight of the composition.

However, when such existing high impact exterior PVC materials are used as a building trim in significant lengths, for example, around large doors or windows or to cover building corners, the coefficient of linear thermal expansion (CLTE) becomes an important property since wrinkling or buckling may occur at high ambient temperatures and slight openings may occur in mated joints at low ambient temperatures. It is desirable, therefore, that this CLTE of such building trim material be as low as possible.

In addition, if such PVC material is supplied in a coiled condition, the coiled PVC may curl and revert back toward its coiled condition rather than lay flat when the material is uncoiled for use.

Accordingly, it is an important object of the invention to provide a permanently bendable, high impact, exterior PVC material, and method of making such material, which has a coefficient of linear thermal expansion that is significantly lower than all presently existing high impact, exterior PVC material whether or not permanently bendable, and is thus particularly adapted for use as building trim material.

Another object of the invention is to provide a permanently bendable, high impact, exterior PVC material and method of making such material which may be supplied in a coiled condition and yet will lay flat with very little, if any, curling back toward its coiled condition when the material is uncoiled for use.

A further specific object of the invention is to provide a generally improved PVC building trim material and method of making such material which has an unusually low coefficient of linear thermal expansion, which may be supplied in a coil which will lay flat when uncoiled and which is more easily bendable, cuttable and generally manageable than existing high impact exterior PVC materials.

SUMMARY OF THE INVENTION

In general, in accord with the invention, a permanently bendable, high impact, exterior PVC material is provided in which the amount of filler used in the PVC melt composition from which the PVC material is extruded is substantially increased, for example, doubled relative to that normally used in making such high impact, exterior PVC material. However, the amount of titanium dioxide remains about the same as normally used while the amount of impact modifier is preferably slightly reduced. Thus, since all the remaining processing ingredients stay the same as usual, the resulting weight percentages in the melt composition are very significantly altered.

More specifically, in typical existing high impact exterior PVC, about 4 parts of filler, 9 parts of titanium dioxide and 5 parts of impact modifier are normally used per 100 parts of PVC resin. In the melt composition of the invention, however, about 9 parts of filler, 9 parts of titanium dioxide and 4 parts of impact modifier are preferably used per 100 parts of PVC resin. In terms of weight percentages, this means that in accord with the invention, the filler is increased from about 3 percent to about 7 percent by weight of the composition. Since the amounts of all the other ingredients in the composition relative to the amount of PVC resin remain approximately the same or are only slightly decreased, this also means that the percent of PVC resin in the composition is also correspondingly decreased. Thus, in accord with the invention the percent of PVC resin is less than 80 percent and preferably about 79% of the composition, while in existing high impact exterior PVC the percent of PVC resin is usually over 81%.

In accord with further aspects of the invention, the improved temperature coefficient and other desirable characteristics of the resulting PVC building trim material are also enhanced by some important changes in the usual method of making PVC material. In the usual method, the material is extruded into desired shape through a die from a melt composition with the temperature at the die maintained above 380 degrees Fahrenheit, usually about 385 degrees Fahrenheit, and then allowed to cool. In accord with the improved method of the invention, however, the melt composition of the invention is extruded as a flat strip through a die maintained at a significantly lower temperature, less than 380 degrees Fahrenheit and preferably about 370 degrees Fahrenheit. The extruded flat strip is then passed through a stack of cooling rollers in order to cool the strip relatively quickly down to an exiting temperature from the final roller preferably no greater than 140 degrees Fahrenheit. This cooled flat strip material is then further cooled down to a high room temperature, preferably no greater than 90 degrees Fahrenheit, by being moved over one or more cooling tables and a take-off table before it is finally wound into a coil and cut into desired length. This lower extrusion temperature of the melt and rapid cool down of the strip material to lower than normal working temperatures has been found to help reduce the coefficient of linear thermal expansion as well as to improve the bendability and manageability of the resulting PVC material.

In accord with a further aspect of the method of the invention, the exiting high room temperature strip material is preferably coiled by winding in a direction opposite to the direction in which the strip material is bent by the last roller in the cooling stack of rollers. Thus, if the final roller bends the strip in the clockwise direction as it travels around the roller, the coiled strip will be wound in a counterclockwise direction, and vice versa. It has been found that this will help cause the strip material to lay flat when it is subsequently unwound for use.

BRIEF DESCRIPTION OF THE DRAWINGS

The novel aspects and features of the PVC material and the method of making the material of the invention are set forth in the appended claims. These novel aspects and features, together with any further objects and advantages, may best be understood by reference to the following detailed description taken in conjunction with the accompanying drawings in which:

FIG. 1 is a chart showing a comparison of the amounts and weight percentages of the major ingredients of one embodiment of the PVC material of the invention relative to the amounts and weight percentages of the corresponding ingredients in all known commercially available high impact exterior PVC material, FIG. 3 is a table showing the results of a test to determine the coefficient of linear temperature expansion of the PVC material of the invention over a range of ambient temperatures from −4 degrees Fahrenheit to +86 degrees Fahrenheit, and FIG. 4 is a chart comparing the tensile and flexural properties of the permanently bendable, high impact, exterior PVC material of the invention relative to those of existing commercially available permanently bendable, high impact, exterior PVC material, such as described in the aforesaid copending patent application Ser. No. 07/805,853.

DESCRIPTION OF PREFERRED EMBODIMENT

Figure 2:
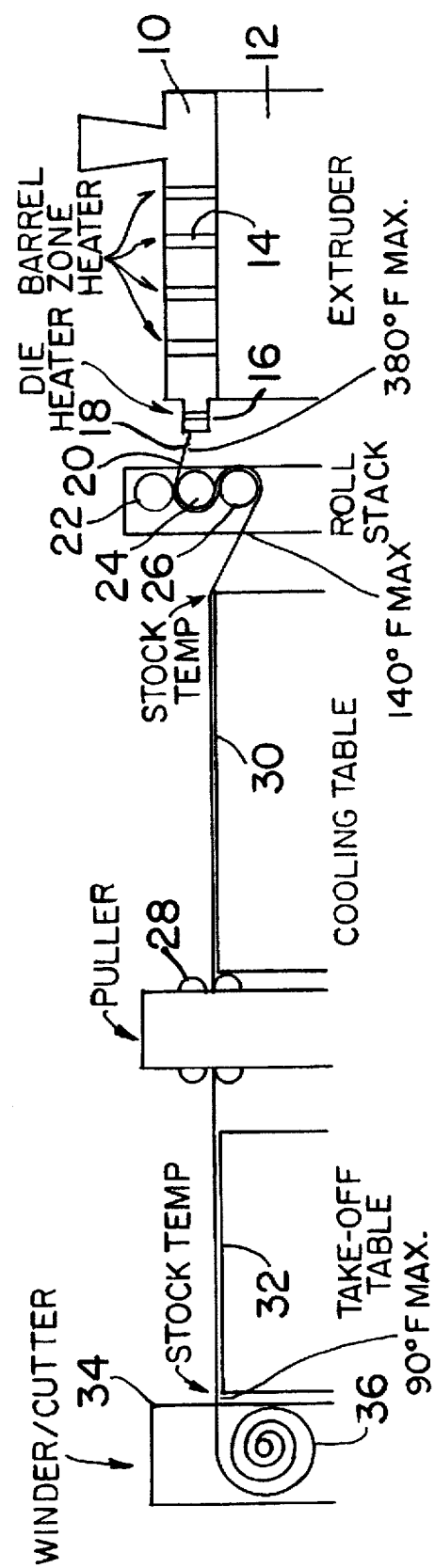
FIG. 2 is a schematic diagram of the manufacturing flow chart of the method used to make the material of the invention with principal temperature control points indicated thereon.

Referring now to FIG. 1, there is shown the composition of the PVC material of the invention as compared to that of the relevant prior art, both in terms of parts per 100 of the PVC resin as well as in terms of weight percentage. The relevant prior art is considered to be all commercially available high impact, exterior grade PVC compositions, such is used for PVC siding, whether bendable or not. As shown by FIG. 1, the principal components of these prior art compositions, comprising over 95% of the total, include the PVC resin, titanium dioxide for ultraviolet degradation inhibition, an impact modifier for gloss control and ductility, and a filler, such as calcium carbonate, for general manageability. The remaining components, amounting to less than 5% of the total, generally include a heat stabilizer, a process aid, calcium stearate, and lubricants. In the composition of the invention material, these remaining components by weight include 1.18% of an organotin heat stabilizer, 0.62% of an acrylic process aid, 0.59% calcium stearate, 1.37% of an ethylene bis-steorimide primary lubricant, and 0.09% of an oxidized polyethylene secondary lubricant.

In the first figure column of FIG. 1, the range, by parts per 100 of PVC resin, of the components of prior art PVC siding materials is shown, while in the second figure column, the mid-range amounts of each such prior art component is shown. In the third figure column, the actual amounts of the same components of the invention composition, by parts per 100 of PVC resin, is shown; while in columns 4 and 5, the corresponding amounts, in terms of weight percentage of the figures in columns 2 and 3 are respectively shown. As indicated by these figures, in accord with the invention, the filler included in the invention composition has been more than doubled over that normally included in the prior art compositions, while the impact modifier has preferably been reduced somewhat. Because of the dramatic increase in the amount of filler, the percentage of PVC resin in the total composition has also been reduced somewhat. Specifically, in the invention composition, by weight, the filler comprises about 7%, the impact modifier about 3% and the PVC resin about 79% of the total, as compared to about 3% for the filler, about 4% for the impact modifier, and about 81% for the PVC resin in the prior art compositions.

This substantial increase in the amount of filler included in the invention composition has several beneficial effects when the resulting extruded material is used for building trim. Firstly, it insures that the resulting PVC material will be easily permanently bendable without cracking and thus can function as a building trim while many of the prior art materials are too brittle and may crack when bent. Secondly, the increased amount of filler unexpectedly helps reduce the coefficient of linear thermal expansion of the material; and thirdly this increase in filler improves the general manageability of the material, including greater ease in cutting and bending as well as in tensile and flexural manipulation.

In accord with a further aspect of the invention, these beneficial effects resulting from this dramatic increase in the amount of filler included in the invention composition may be further augmented by the novel method by which the material is made, and more particularly by a general reduction in the temperatures normally used during the various steps of the process involved.

Referring now to FIG. 2, in accord with the method of making the material of the invention, the components of the invention composition are placed in the barrel 10 of an extruder 12, and maintained in melted condition by the barrel heaters 14. A die heater 16 controls the temperature at which the melt composition is extruded through a die 18. For use as a building trim material, the die 18 is shaped to produce a flat extruded strip 20, for example, about 24 inches wide and from 0.03 to 0.10 inches thick and preferably 0.036 inches thick. The extrusion temperature at the die is maintained less than 380 degrees Fahrenheit, and preferably about 370 degrees Fahrenheit, which is considerably less than the extrusion temperatures, well above 380 degrees Fahrenheit, normally used for PVC materials such as house siding. The extruded strip 20 is then passed through a stack of cooling rollers 22, 24, 26 and cooled more rapidly than normal down to a stock temperature exiting the cooling roller stack preferably no greater than 140 degrees Fahrenheit. This partially cooled strip 20 is then driven by a puller mechanism 28 over a cooling table 30 and along a take-off table 32 to a winder/cutter 34. This winder/cutter 34 winds the fully cooled strip 20 into a coil 36 and cuts it to a desired length. The stock temperature of the strip 20 immediately prior to winding is controlled by the cooling table 30 and take-off table 32 to be at high room temperature, preferably no greater than 90 degrees Fahrenheit. Here again, this coiling temperature used for the invention material is lower than the temperatures normally used when coiling PVC material.

In accord with a further aspect of the invention, the strip 20 is coiled by winder/cutter 34 in a direction opposite to that in which the strip 20 passes around the final roller 26 in the cooling roller stack. Since in FIG. 2 the strip 20 is shown as passing around roller 26 in a clockwise direction, the strip 20 is shown as being wound in a counterclockwise direction. This opposed direction of winding helps to insure that the coiled strip material of the invention will lay flat with virtually no tendency to recurl back to its coiled condition when the strip is uncoiled for use. The reduced temperature at which strip 20 is coiled and the additional filler in the composition of the material are believed to contribute to this ability of the material to lay flat when uncoiled.

Referring now to FIG. 3, the results of a test of the invention material to determine its coefficient of linear thermal expansion is shown. The test was run over a temperature range of from −4 degrees F to 86 degrees F. with reference to a starting point of −22 degrees F. The resulting CLTE values extend from 2.58×10 in/in/degree F. at −4 degrees F. to 2.81×10 in/in/degree F. at 86 degrees F. with an average CLTE of 2.7×10 in/in/degree F. When determining an actual expansion, this average CLTE is multiplied by the length of the sample and then by the total temperature change.

This average CLTE of 2.7×10 in/in/degree F. of the invention material is about 20% lower than the average CLTE of existing commercially available high impact exterior PVC material which is about 3.4×10 in/in/degree F. Tests made of several such existing PVC materials having ingredients within the ranges set forth in the first column of figures of FIG. 1 all prove that the CLTE of such existing PVC materials is about 3.4×10 in/in/degree F. This very great improvement in the CLTE of the invention PVC material is believed attributable both to the much higher filler content of the invention material and to the lower than normal temperatures at which the invention material is extruded and processed.

Referring now to FIG. 4, the results of tests of the tensile and flexural properties of the invention PVC material are shown in comparison to those of certain existing permanently bendable PVC materials set forth in the aforementioned prior U.S. patent application Ser. No. 07/805,853; namely, the PVC material designated "BWSBHXX" made by Nan Ya Plastics Corporation of Carteret, N.J., and the PVC material designated "OXYBLEND 3373 PVC COMPOUND" made by Occidental Chemical Corporation of Wayne, Pa. As can be seen from these test results, the tensile modulus of the invention PVC material is about the same as that of the existing permanently bendable PVC materials while the tensile yield strength, flexural yield strength, and flexural modulus of the invention material is somewhat lower than those of the existing materials. These results are consistent with the improved manageability found in practice of the invention PVC material over existing permanently bendable PVC material, namely, that less force is required for bending, cutting and flexural manipulation of the invention PVC material. This is believed to be due primarily to the significantly increased percent of filler in the material. The need to overbend is substantially reduced because the new compound is far less springy.

The inventive material in addition to its use as a building trim, can also find other uses because of its unique properties. By way of example, it can be used for siding on a house, as well as forming structural enclosures for outdoor use such as a canopy. It can also be used for other exterior purposes where it is exposed to ambient conditions for great lengths of time.

While a specific embodiment and method of making the PVC material of the invention has been described, it should be understood that various changes and modifications may be made thereto without departing from the spirit and scope of the invention as set forth in the appended claims.

What is claimed is:

1. A flat length of extruded high impact, exterior polyvinyl chloride (PVC) material comprising no more than 80 percent by weight of PVC resin, about 7% by weight of titanium dioxide and about 7 percent by weight of calcium carbonate, said material being permanently bendable without cracking and having an average coefficient of thermal expansion of about 2.7×10 in/in/decree Fahrenheit over the range of ambient temperatures from minus 4 to plus 86 degrees Fahrenheit.

2. The flat length of extruded PVC material of claim 1 wherein the flat length comprises a coiled flat strip length for use as building trim material said coil having the characteristic of restoring its flat shape upon being unwound.

3. The flat length of extruded PVC material of claim 1 wherein the PVC material also contains about 3 percent by weight of an impact modifier.

4. A building trim material comprising a coiled flat length of high impact, exterior polyvinyl chloride (PVC) material, said material containing by weight about 79 percent PVC resin, about 7 percent of titanium dioxide, about 3 percent of an impact modifier and about 7 percent of a filler in addition to said titanium dioxide, said material being permanently bendable and having an average coefficient of linear thermal expansion of about 2.7×10 in/in/degree Fahrenheit over the range of ambient temperatures from minus 4 to plus 86 degrees Fahrenheit.

5. The building trim material of claim 4 wherein said filler is calcium carbonate.

6. The flat length of extruded PVC material of claim 1, said material having been extruded at an extrusion exit temperature below 380 degrees Fahrenheit.

7. The coiled flat strip length of extruded PVC material of claim 2, said material having been rapidly cooled down to a temperature below 90 degrees Fahrenheit immediately before being coiled.

* * * * *